(12) United States Patent
Curlee et al.

(10) Patent No.: US 10,850,757 B1
(45) Date of Patent: Dec. 1, 2020

(54) INTEGRATED SHOCK AND VIBRATION ISOLATION

(71) Applicant: Dell Products L.P., Round Rock, TX (US)

(72) Inventors: James Don Curlee, Round Rock, TX (US); Steven Embleton, Austin, TX (US); Joshua Scott Keup, Austin, TX (US); Ben John Sy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/681,336

(22) Filed: Nov. 12, 2019

(51) Int. Cl.
*B62B 3/00* (2006.01)
*B62B 5/00* (2006.01)

(52) U.S. Cl.
CPC .............. *B62B 3/003* (2013.01); *B62B 3/004* (2013.01); *B62B 3/005* (2013.01); *B62B 5/0006* (2013.01); *B62B 2202/56* (2013.01); *B62B 2301/044* (2013.01)

(58) Field of Classification Search
CPC .............. B62B 5/0006; B62B 2202/56; B62B 2301/044; B62B 3/003; B62B 3/004; B62B 3/005; B62B 3/002
USPC .................................... 280/47.22, 79.11, 79.3
See application file for complete search history.

(56) References Cited

U.S. PATENT DOCUMENTS

| | | | | |
|---|---|---|---|---|
| 4,728,160 A | * | 3/1988 | Mondor | H05K 7/1429 312/236 |
| 7,551,971 B2 | * | 6/2009 | Hillis | H05K 7/1497 267/140.11 |
| 7,556,271 B2 | | 7/2009 | Robbins et al. | |
| 7,854,652 B2 | | 12/2010 | Yates et al. | |
| 8,490,413 B2 | | 7/2013 | Blackway et al. | |
| 9,423,001 B2 | | 8/2016 | Green et al. | |
| 9,701,330 B2 | | 7/2017 | Mkandawire et al. | |
| 9,732,979 B2 | | 8/2017 | Fadell et al. | |
| 9,992,913 B1 | * | 6/2018 | Czamara | H05K 7/20736 |
| 10,334,749 B2 | | 6/2019 | Eckberg et al. | |
| 2003/0041409 A1 | | 3/2003 | Caporale | |
| 2006/0243690 A1 | * | 11/2006 | Mollard | H05K 5/02 211/151 |
| 2011/0149508 A1 | | 6/2011 | Malekmadani | |

(Continued)

OTHER PUBLICATIONS

Affordable Display Products, Wood Chart File Wall Rack with 4 Pockets, https://www.affordabledisplayproducts.com/Display-Products/Medical-Chart-File-Holders-Hanging-File-Folder-Racks-Medical-Chart-Holders/CH14-2-Chart-File-Wall-Rack-Wood.

(Continued)

*Primary Examiner* — John D Walters
(74) *Attorney, Agent, or Firm* — Jackson Walker L.L.P.

(57) ABSTRACT

An apparatus may include an enclosure portion having a width, a depth, and a height, wherein the enclosure portion has a footprint defined by the width and the depth, and wherein the enclosure portion includes a plurality of mounting features that are configured to receive information handling systems along a direction corresponding to the depth. The apparatus may further include a base portion disposed below the enclosure portion and coupled to the enclosure portion. The apparatus may yet further include a plurality of casters coupled to the base portion and mounted in respective positions that are laterally displaced from the base portion such that the positions are outside the footprint of the enclosure portion.

20 Claims, 6 Drawing Sheets

(56) References Cited

U.S. PATENT DOCUMENTS

| | | | |
|---|---|---|---|
| 2012/0104917 A1* | 5/2012 | Fan | H05K 7/1488 |
| | | | 312/326 |
| 2013/0032310 A1* | 2/2013 | Jaena | H05K 7/20681 |
| | | | 165/104.25 |
| 2015/0186840 A1 | 7/2015 | Torres et al. | |
| 2018/0127147 A1* | 5/2018 | Embleton | B65D 81/02 |

OTHER PUBLICATIONS

Caster Concepts, 5 Industries Where Shock Absorbing Caster Wheels are Perfect, Aug. 8, 2018, https://www.casterconcepts.com/industries-shock-absorbing-caster-wheels.

Crenlo, Emcor Defender Air Conditioned Server Rack Cabinets, https://www.crenlo.com/emcor/enclosures/datacom/server-cabinets/defender/.

Fernandez-Carames, Tiago M. and Fraga-Lamas, Paula, A Review on Human-Centered IoT-Connected Smart Labels for the Industry 4.0, May 7, 2018, IEEE Access, Special Section on Human-Centered Smart Systems and Technologies, vol. 6, 2018, pp. 25939-25957.

18U Open Frame 2 Post Server IT Network Data Rack HQ Relay on Casters Sysracks, https://www.amazon.com/Frame-Server-Network-Casters-Sysracks/dp/B079M19BXD.

Pelican-Hardigg Rack Mount Cases, https://www.pelican.com/us/en/professional/rack-mount-cases/.

RackLift RL5000E | 5000LB Server Cabinet Lifter, https://racklift.com/datacenter-products/racklift-rl5000e/.

ServerLift SL-500X Electric Lift, https://serverlift.com/data-center-lifts/sl-500x/.

Starcase, Elastomeric Isolation Mounts, https://www.starcase.com/Articles.asp?ID=256.

StepLift Ltd., Steplift's Server Management System, https://web.archive.org/web/20180428135226/https://www.steplift.com/server-management-system/.

\* cited by examiner

INTEGRATED SHOCK AND VIBRATION ISOLATION

TECHNICAL FIELD

The present disclosure relates in general to information handling systems, and more particularly to transportation of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various problems are known in the field of transportation and delivery of information handling systems, particularly in the enterprise context of rack-mounted systems including a plurality of standard-sized server information handling systems. Currently, integrated rack solutions are typically delivered to customers on a wooden pallet with foam (e.g., extruded polystyrene foam) to mitigate shock events. The shipping environment is extremely harsh, and integrated rack solutions can see significant forces, causing damage to the rack or the internal equipment.

The use of wood, foam, plastics, etc. in shipping information handling systems is not ideal due to dirt and possible debris entering the systems. The wood and foam pallet also significantly increases the height of the system, and often there are issues with fitting an integrated rack onto a truck or maneuvering it through a data center due to height restrictions.

Further, there are situations where a rack manufacturer provides only a rack solution, and thus the shock and/or vibration solutions must be provided separately. This adds significant time and expense for testing the specific rack on a new pallet design. Additionally, even aside from shock events during shipping, a rack full of information handling systems can still experience significant shock events on the manufacturing floor by being moved around during construction, as well as at the delivery site during off-loading.

Existing solutions are also undesirable in terms of the excess wood, foam, plastic, corrugate, and other debris involved. Buyers of information handling systems would prefer a more environmentally friendly solution that does not require disposal of such materials. Finally, there are no existing shock isolation options within the rack design itself.

Thus it would be desirable for an integrated transportation system to address these shortcomings in a safe, environmentally friendly manner.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with transportation of information handling systems may be reduced or eliminated.

In accordance with embodiments of the present disclosure, an apparatus may include an enclosure portion having a width, a depth, and a height, wherein the enclosure portion has a footprint defined by the width and the depth, and wherein the enclosure portion includes a plurality of mounting features that are configured to receive information handling systems along a direction corresponding to the depth. The apparatus may further include a base portion disposed below the enclosure portion and coupled to the enclosure portion. The apparatus may yet further include a plurality of casters coupled to the base portion and mounted in respective positions that are laterally displaced from the base portion such that the positions are outside the footprint of the enclosure portion.

In accordance with these and other embodiments of the present disclosure, a method may include forming an enclosure portion of an apparatus with a width, a depth, and a height, wherein the enclosure portion has a footprint defined by the width and the depth; coupling a plurality of mounting features to the enclosure portion, the mounting features being configured to receive information handling systems along a direction corresponding to the depth; coupling a base portion disposed below the enclosure portion to the enclosure portion; and coupling a plurality of casters to the base portion in respective positions that are laterally displaced from the base portion such that the positions are outside the footprint of the enclosure portion.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
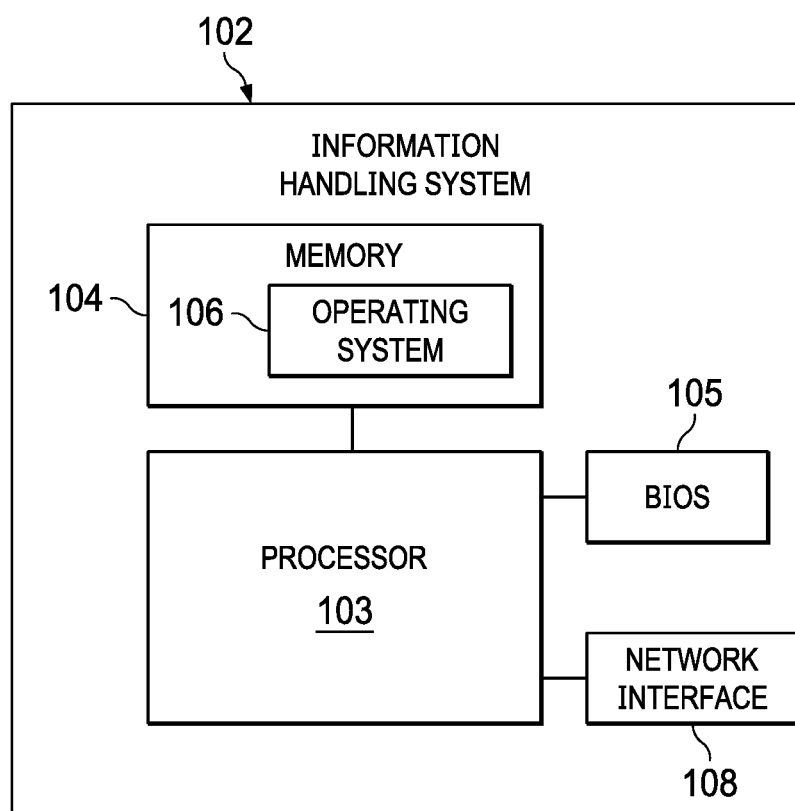
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "couple-able" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, various problems are known in the art of transportation and delivery of information handling systems (e.g., information handling system 102). Accordingly, a transportation apparatus referred to herein as a tote may be used as an all-in-one solution that dampens shock events via shock absorbers and/or isolators fully integrated into a server rack, having a ship loadable design. Such a tote may be made of any suitable material (e.g., steel).

Figure 2A:
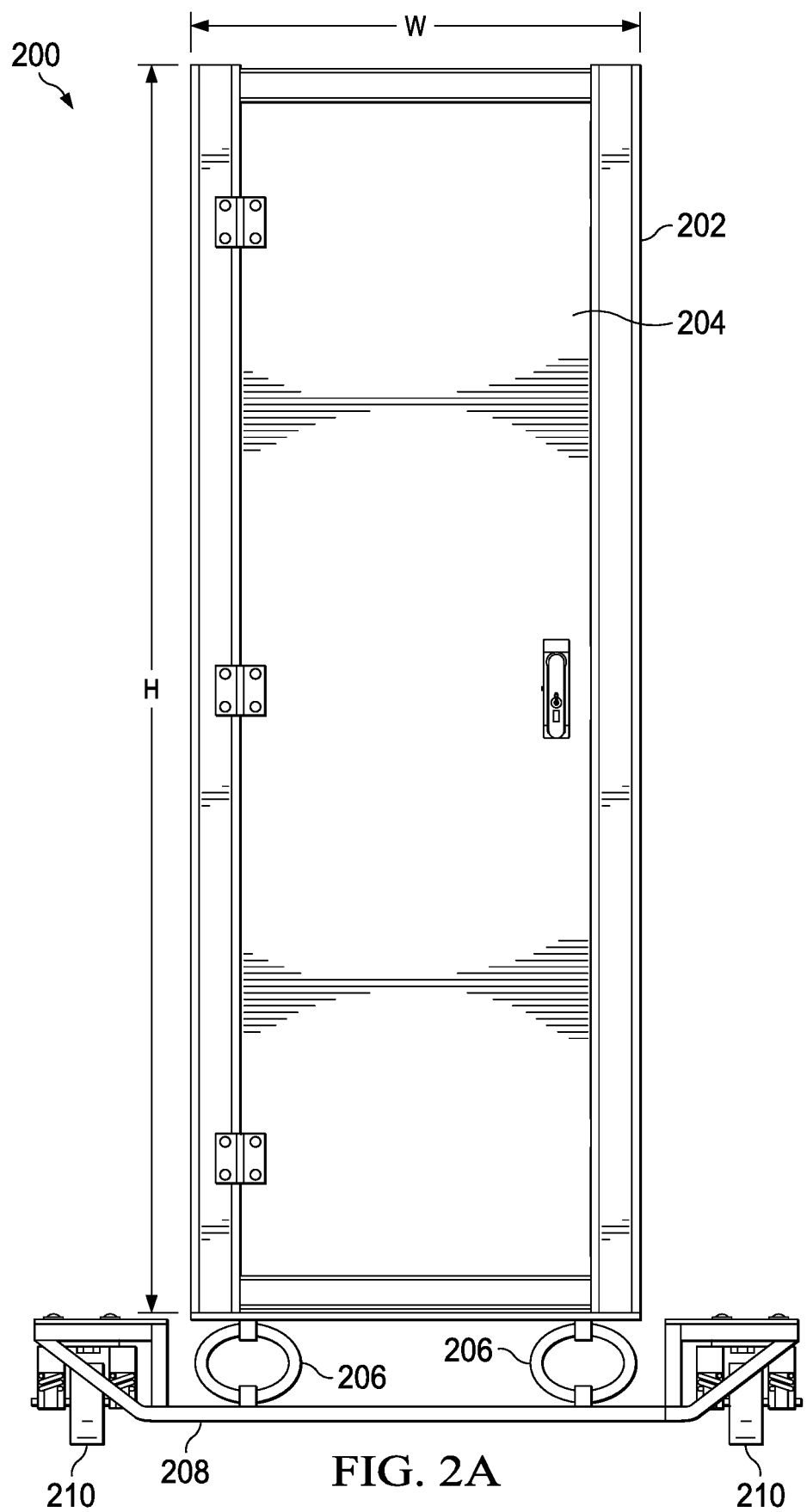
FIG. 2A illustrates a front view of an example transportation apparatus, in accordance with embodiments of the present disclosure.
Figure 2B:
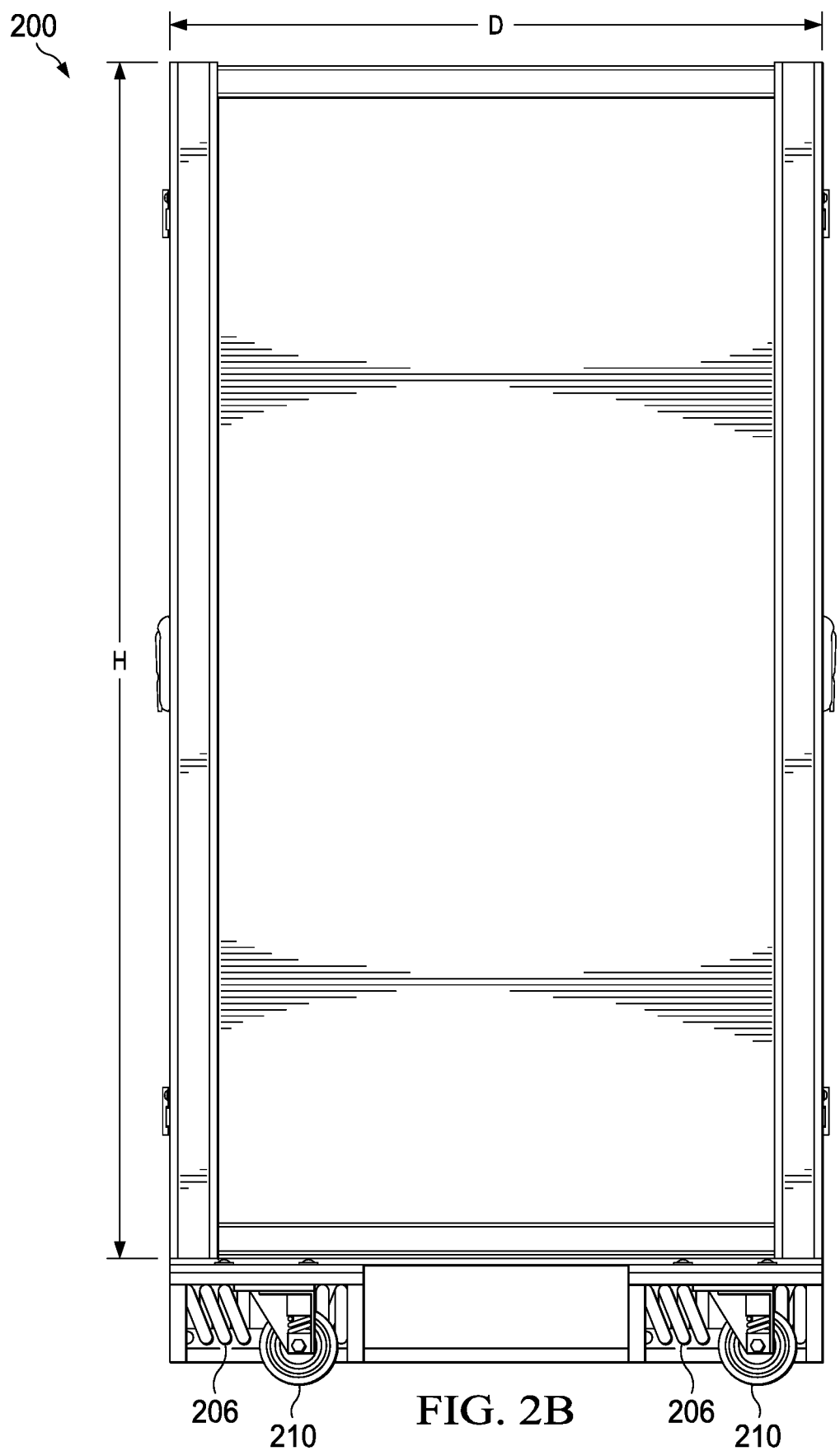
FIG. 2B illustrates a side view of the embodiment of FIG. 2A.
Figure 2C:
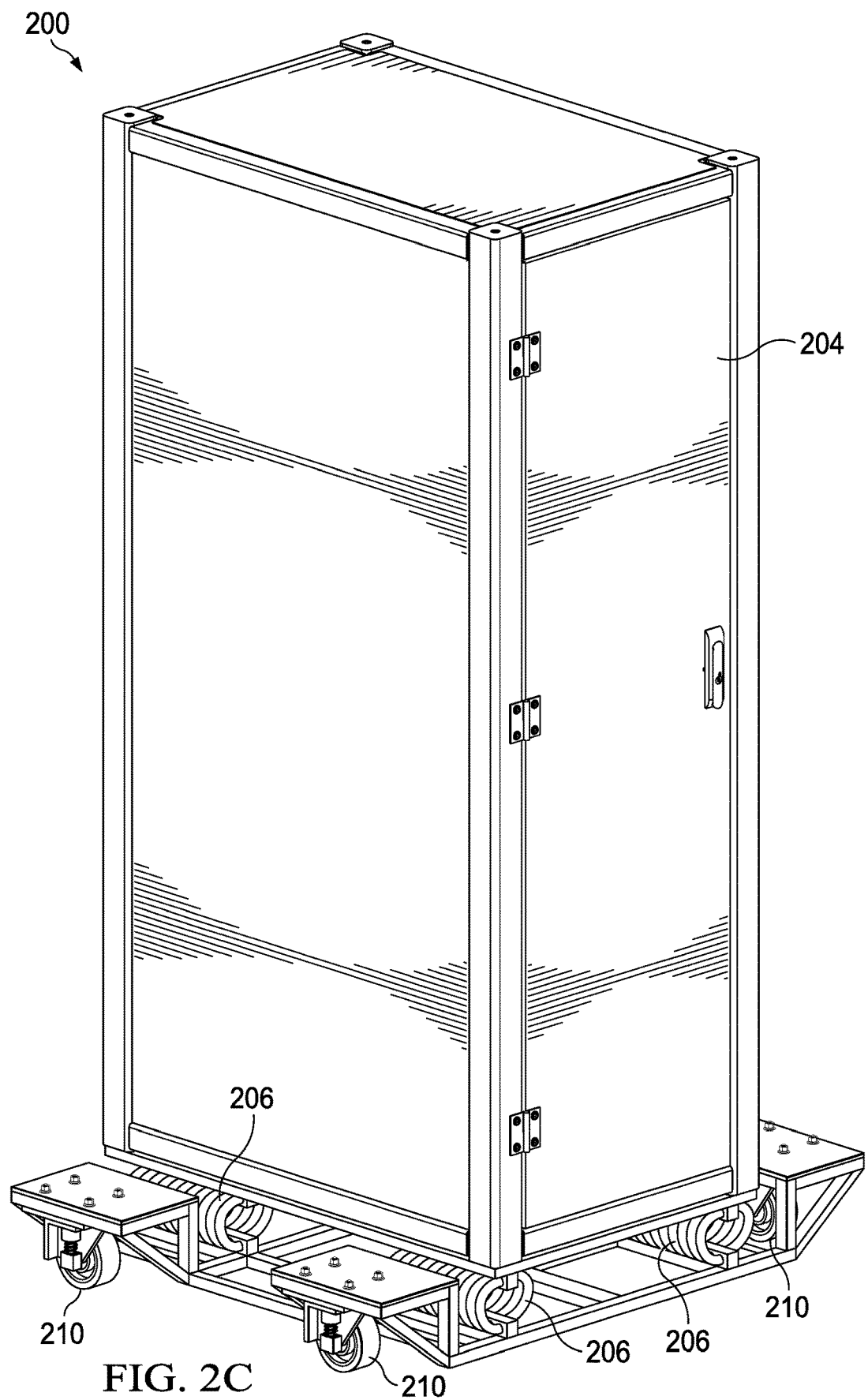
FIG. 2C illustrates a perspective view of the embodiment of FIG. 2A.

Turning now to FIGS. 2A-2C, several views are shown of an example tote 200. Tote 200 includes an enclosure portion 202 coupled on top of a base portion 208. Enclosure portion 202 may include a door 204 and a rack (not explicitly shown in these views) for receiving a plurality of information handling systems such as information handling system 102. In some embodiments, the rack may be manufactured according to a standard such as EIA-310, which defines standard rack unit sizing. For example, the embodiment shown at tote 200 may be sized to accommodate 40 rack units worth of information handling systems. In other embodiments, different sizes may be used such as 21-inch server equipment, laptops, desktops, other types of information handling systems, or information handling resources such as internet-of-things (IOT) hardware, hard drives, monitors, etc.

In some embodiments, tote 200 may be usable only for transport of information handling systems (e.g., it may not be configured for powering and operating such systems while they are received in the rack).

The rack may be isolated from vibrations during transit via the use of isolators 206. In various embodiments, isolators 206 may be wire rope, elastomeric, or any other suitable type of isolator. In the embodiment shown, isolators 206 are of the wire rope type. In some embodiments, tote 200 may also include lateral shock absorbers for protection from bumps that it may experience during integration and transportation (e.g., running into other racks, walls, truck walls, etc.).

Base portion 208 may also include casters 210 (e.g., four casters 210), which may be installed in an "outrigger" configuration. For example, enclosure portion 202 has a height H, a width W, and a depth D as shown. The width and the depth may define a footprint for enclosure portion 202, and casters 210 may be disposed in positions that are laterally displaced such that they reside outside of the footprint of enclosure portion 202. In the embodiment shown, casters 210 may be shock-absorbing casters. For example, they may have integral shock dampers and/or may be mounted on shock-damping mounts.

The outrigger configuration for casters 210 may provide additional stability, when compared to a configuration in which casters 210 are within the footprint of enclosure portion 202 (e.g., below enclosure portion 202). Further, the displacement of casters 210 along the width direction but not along the depth direction may allow for the total depth of tote 200 may be minimized, allowing for movement through narrow doors, elevators, etc. Further, the need for pallet jacks may be eliminated.

The configuration of casters 210 and isolators 206 shown may further allow tote 200 to have a reduced total height, easing travel in constrained spaces.

Figure 3:
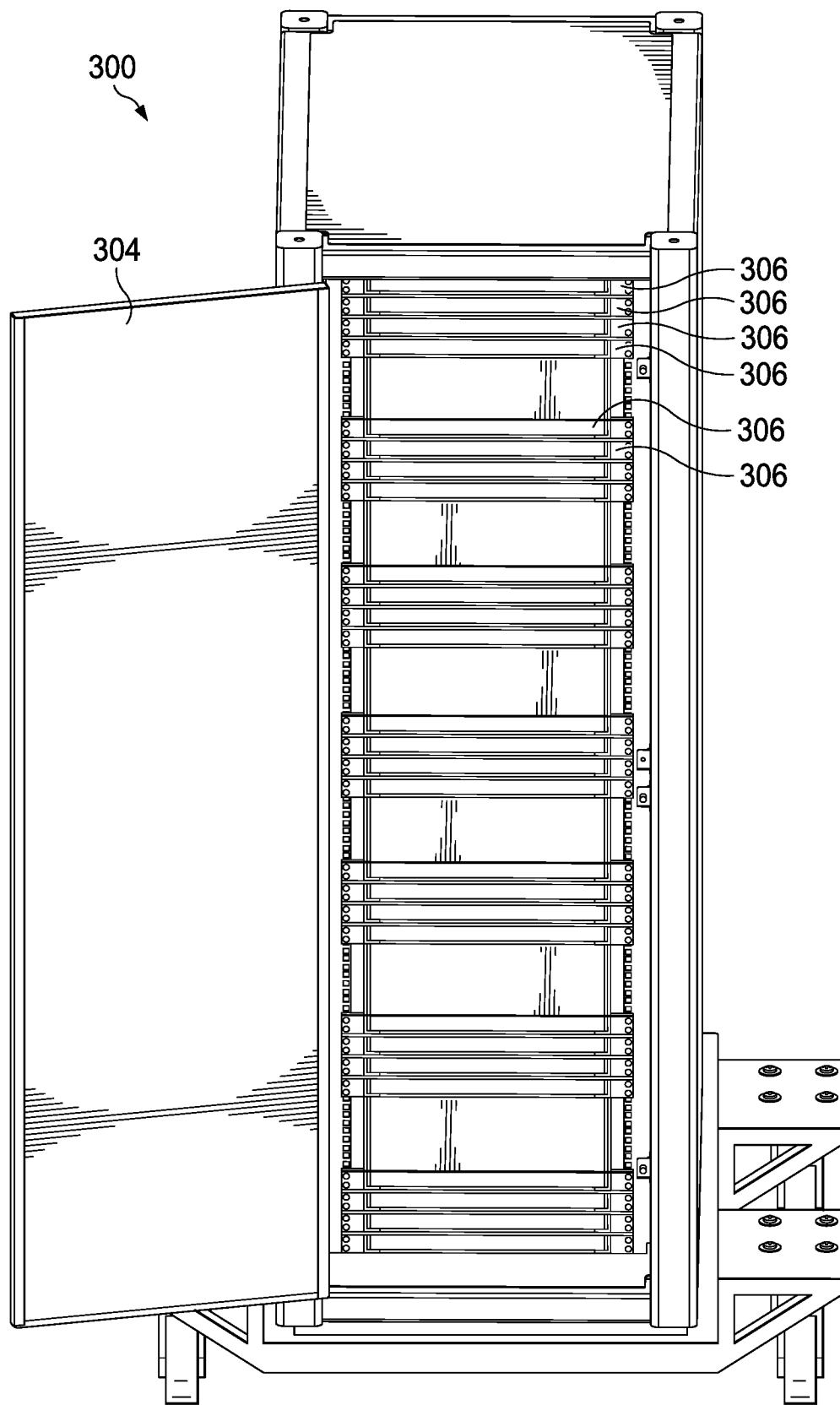
FIG. 3 illustrates a front view of another example transportation apparatus, in accordance with embodiments of the present disclosure.

FIG. 3 shows an embodiment of a similar tote 300, in which door 304 has been opened. As can be seen in this view, a plurality of mounting features 306 are disposed within the enclosure portion of tote 300. For example, mounting features may include rails, shelves, or any other suitable hardware for securely attaching and/or retaining information handling systems.

Figure 4:
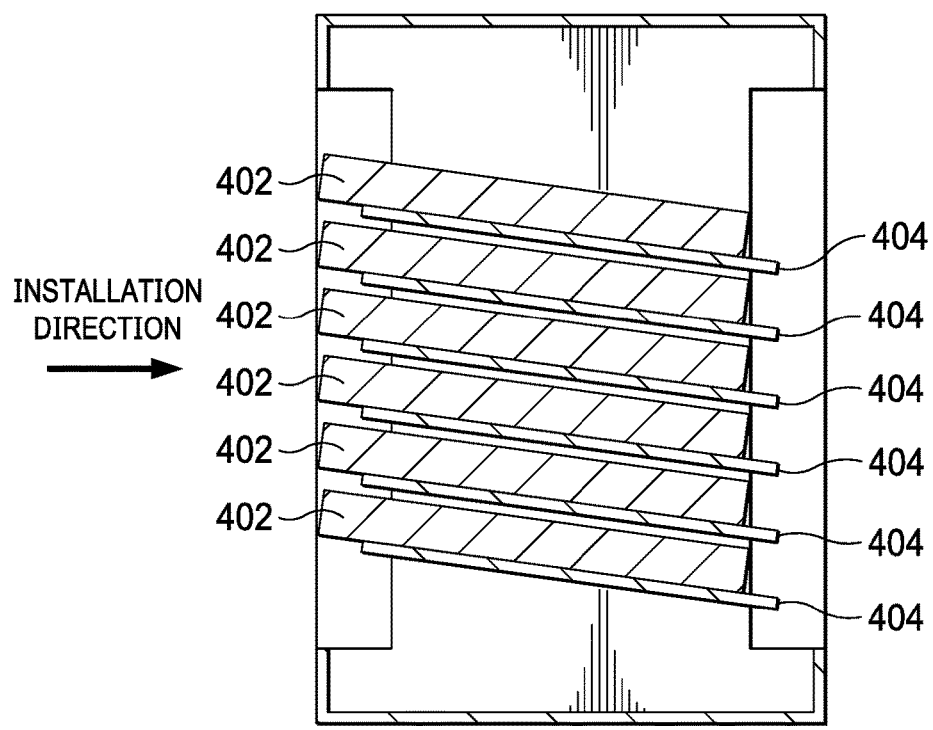
FIG. 4 illustrates a cutaway side view of a portion of another example transportation apparatus, in accordance with embodiments of the present disclosure.

FIG. 4 shows a cutaway side view of a rack, in accordance with some embodiments. Traditionally, information handling systems are installed in a rack in a horizontal orientation (e.g., with their faces all disposed along a flat plane). This traditional orientation facilitates usability and servicing, and it may maintain a smaller footprint.

Such a traditional installation may be more difficult, however, in terms of the small vertical tolerance for fit. Further, it may require that the equipment be securely mounted to rails. If mounting screws were to come loose during transportation, a flat-mounted server could fall out of the rack or slide forward to the end of the rail, vastly increasing the risk for damage.

Accordingly, the embodiment shown in FIG. 4 allows information handling systems 402 to be mounted at an angle. In lieu of or in addition to mounting rails, the mounting features of FIG. 4 may include angled shelves 404. In particular, shelves 404 may be angled downward, increasing the allowed vertical installation tolerance. Only a minimal latch may be required in this configuration as well, as the weight of information handling systems 402 will help maintain them in position.

In some embodiments, angled shelves 404 may include further shock and/or vibration damping materials. In some embodiments, the standard square holes of a standard rack may even be omitted, and angled shelves 404 may be solely relied upon for retention. In some embodiments, flip-down louvers may be used at the front of angled shelves 404, such that only the populated shelves are opened. For example, angled shelves 404 may be sized to accommodate 1U rack sizes. But to accommodate a 2U or larger system, only certain louvers may be opened, etc.

Figure 5:
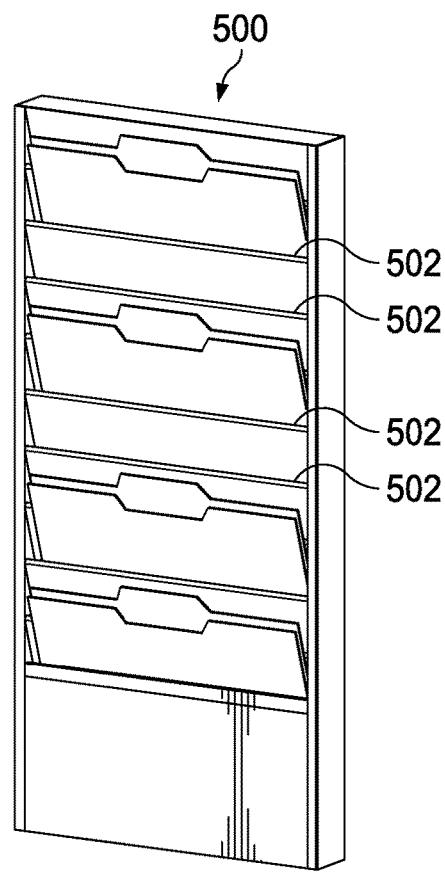
FIG. 5 illustrates a storage system usable in accordance with embodiments of the present disclosure.

Turning now to FIG. 5, an additional feature is shown at storage system 500. Storage system 500 includes a plurality of document retaining receptacles 502 and may be disposed on an inner surface of a tote (e.g., at an inner surface of door 304). Documentation regarding the information handling systems installed in a tote may advantageously be stored in storage system 500. For example, each document retaining receptacle 502 may be labeled to correspond to a particular location within the rack, etc.

The embodiment of FIG. 5 may be an improvement on existing methods, in which deliveries involve placing an information handling system in a single-server or multi-pack corrugate box with foam, plastic, and miscellaneous other materials that are disposed of once the system is removed. The server manual, regulatory information, etc. can be easily lost once removed from the box. Sending replacement materials is time-consuming for support groups, and it is also costly due to the amount of logistics costs incurred from delivery of replacement material.

Thus the embodiment of FIG. 5 incorporates an internal filing system, which may be used for hard copy server guides, manuals, regulatory information, and any other material accompanying the server(s) being delivered. At delivery, the customer may quickly remove servers stacked in a tote due to the elimination of trash. The customer can then quickly locate the server hard copy material by finding the corresponding location on the storage system 500 pre-integrated into the tote's front door. The storage system 500 may be labeled with all rack unit locations of the tote, and the customer may easily be able to find the correct server information at a glance. The integrated file delivery system may also be automated, or augmented with "smart" technology devices and features, and/or lights, alarms, or the like to help the customer find the correct information easily.

Throughout the foregoing, various mechanical features that may be included in several example totes have been described with reference to FIGS. 2A through 5. The next portion of this disclosure will describe various functionalities that may apply to some of such example totes.

It is a known problem that sensitive data and hardware cannot easily be disposed of or kept safe in a public or work environment. Further, there are also potential space limitations for important tools used to debug information handling equipment in a data center environment. The equipment or hardware used to fix information handling systems is not only sensitive to damage, but it can be also expensive to maintain.

These items are thus typically be placed in lockers and tracked in an inventory management system. Data center personnel do not have the time to efficiently process defective hardware, dispose of it correctly, and keep track of all of the required components needed for a large fleet of information handling systems. At times they may need to go to different parts of a data center that are far away from the room where a system exists that needs work. This is not an effective use of their time, and there is currently no movable work station where a customer could easily debug with tools, replace failing components with hardware, and dispose of failing or old components that need to be replaced or refreshed. Rental space at data centers can be extremely expensive, and the customer may not have the funds to invest in a room for parts, tools, aging and sensitive equipment storage.

Accordingly, some totes according to this disclosure may be used not only for multi-pack information handling system deliveries, but also used for a myriad of other important services (e.g., once the customer has unloaded the information handling systems delivered therein). For example, a tote may be used as a sensitive hardware disposal system, a storage locker for tools, and a parts locker crash cart, in some embodiments. The tote may be used as a multi-functioning moveable cabinet that is secure (e.g., with lockable doors, two-factor authentication, a biometric reader, etc.) to help the customer efficiently accomplish any needed service tasks with tools and replacement hardware while being able to dispose of aging or defective hardware in a safe storage location that can be removed and sent out once full. The customer can increase throughput by using totes in this fashion as a work aid. The tote system may also be used as a moveable parts locker if there exists insufficient space at a data center site for excess parts storage.

In another embodiment, a tote may be used as a secure drop bin for defective hardware that needs to be returned for failure analysis or serviced on site. Lockable doors pre-integrated into the tote may allow for customers to easily drop defective or end-of-life hardware into without worry of data being stolen or lost in the process. For example, a tote may include an aperture through which information handling resources may be inserted, and the inserted devices may be securely retained.

As discussed elsewhere herein, one of the advantages of this disclosure is that it provides a more environmentally friendly way of delivering information handling systems. Current delivery methods generate an inordinate amount of waste, and many customers would prefer not to have to deal with such bulky debris.

Transportation totes according to this disclosure may be multi-pack solutions that leverage integrated racks to solve customers' excess trash problems while also reducing the environmental impact. The tote eliminates the need for any corrugate and foam, and it also reduces the carbon footprint by fitting far more densely inside of a truck trailer (e.g., three times as densely as existing methods). This may result in a reduction in the number of trucks required for delivery.

In some embodiments, the immense environmental savings associated with this disclosure may be tracked via an integrated information handling resource within the tote and may be displayed on the tote's exterior side walls or via an automatically updating ticker (e.g., an e-ink display) that counts the amount of carbon pollution, plastic, and/or number of corrugate boxes saved.

At each delivery, the customer may notate and track the amount of environmental savings via each delivery to continue to promote a green company story as well as use such data for key green metric recordings.

A ticker integrated into the tote may help build and strengthen customer relationships by aligning on key initiatives that save the planet. As the totes show up to the customer dock, the customer may be able to quickly realize the environmental savings at the time of delivery. An additional benefit is cost savings from elimination of corrugated cardboard, foam, lumber, and plastic, and also logistics cost savings due to being able to ship several times the number of systems on a single truck trailer compared to single or multi-server pack boxes. Further, for example, in some embodiments, totes according to this disclosure may be completely reusable without the need to ship any single-use material for the customer to dispose of.

Thus some embodiments of this disclosure may include a method for promoting the environmental impact of such reusable totes. This may incentivize customer behavior that promotes green initiatives and zero waste guiding principles by allowing them to be participatory in the process. Embodiments may enable tracking, aggregating, and disseminating positive environmental impact statistics per customer, as well as providing a report.

For example, an information handling resource such as a low-power RFID tag may be affixed to a tote. Such an RFID tag may include information regarding the tonnage of corrugate, plastic, foam, etc., saved on this delivery.

Since the totes may typically come from a local hub, the RFID tag information may be updated to a customer order and location. The RFID tag may also have cumulative "odometer" type data regarding the amount saved for the life of the transport tote. "Carbon credits" or other financial incentives may also be calculated during the ordering process for customers that elect to use a tote instead of a traditional delivery method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An apparatus comprising:
    an enclosure portion having a width, a depth, and a height, wherein the enclosure portion has a footprint defined by the width and the depth, and wherein the enclosure portion includes a plurality of mounting features that are configured to receive information handling systems along a direction corresponding to the depth;
    a base portion disposed below the enclosure portion and coupled to the enclosure portion via at least one vibration damper, wherein the at least one vibration damper is a wire rope isolator; and
    a plurality of casters coupled to the base portion and mounted in respective positions that are laterally displaced from the base portion such that the positions are outside the footprint of the enclosure portion.

2. The apparatus of claim 1, wherein the enclosure portion and the mounting features are sized to receive information handling systems that conform to standardized rack unit sizes.

3. The apparatus of claim 1, wherein the plurality of casters are disposed laterally away from the base portion in a direction corresponding to the width of the enclosure portion.

4. The apparatus of claim 1, wherein the plurality of mounting features are angled downward from a front of the enclosure portion toward a rear of the enclosure portion.

5. The apparatus of claim 4, wherein the plurality of mounting features include a plurality of shelves configured to support the information handling systems.

6. The apparatus of claim 1, further comprising a door at a front of the enclosure portion.

7. The apparatus of claim 6, further comprising a plurality of document retaining receptacles disposed on an inner surface of the door.

8. The apparatus of claim 6, wherein the door comprises a lock.

9. The apparatus of claim 8, further comprising an aperture through which information handling resources are insertable, wherein the apparatus is configured to securely retain the inserted information handling resources.

10. The apparatus of claim 1, wherein the plurality of casters are shock-absorbing casters.

11. The apparatus of claim 1, wherein the apparatus is reusable such that, without the use of any single-use materials:
    the apparatus is configured to have loaded therein a plurality of information handling systems, be transported from a first location to a second location, and have the plurality of information handling systems be unloaded therefrom.

12. The apparatus of claim 11, further comprising an information handling resource that is configured to track an environmental impact of the apparatus across a plurality of reuse cycles.

13. The apparatus of claim 1, wherein the apparatus is configured for transportation of the information handling systems, but is not configured to allow for operation of the information handling systems while the information handling systems are received therein.

14. A method comprising:
    forming an enclosure portion of an apparatus with a width, a depth, and a height, wherein the enclosure portion has a footprint defined by the width and the depth;
    coupling a plurality of mounting features to the enclosure portion, the mounting features being configured to receive information handling systems along a direction corresponding to the depth;
    coupling a base portion disposed below the enclosure portion to the enclosure portion via at least one vibration damper, wherein the at least one vibration damper is a wire rope isolator; and
    coupling a plurality of casters to the base portion in respective positions that are laterally displaced from the base portion such that the positions are outside the footprint of the enclosure portion.

15. The method of claim 14, wherein:
    the plurality of casters are disposed laterally away from the base portion in a direction corresponding to the width of the enclosure portion; and
    the method further comprises rolling the apparatus along a direction corresponding to the depth of the enclosure portion.

16. The method of claim 14, further comprising coupling a lockable door to the enclosure portion at a front of the enclosure portion.

17. The method of claim 16, further comprising:
    coupling a plurality of document retaining receptacles to an inner surface of the lockable door; and
    inserting documentation into the plurality of document retaining receptacles, the documentation regarding information handling systems that have been received in the enclosure portion.

18. The method of claim 14, further comprising:
    loading a plurality of information handling systems into the enclosure portion;
    transporting the apparatus from a first location to a second location;
    unloading the plurality of information handling systems from the enclosure portion; and reusing the apparatus by loading a second, different plurality of information handling systems into the enclosure portion.

19. An apparatus comprising:

an enclosure portion having a width, a depth, and a height, wherein the enclosure portion has a footprint defined by the width and the depth, and wherein the enclosure portion includes a plurality of mounting features that are configured to receive information handling systems along a direction corresponding to the depth;

a base portion disposed below the enclosure portion and coupled to the enclosure portion; and a plurality of casters coupled to the base portion and mounted in respective positions that are laterally displaced from the base portion such that the positions are outside the footprint of the enclosure portion;

wherein the apparatus is configured for transportation of the information handling systems, but is not configured to allow for operation of the information handling systems while the information handling systems are received therein.

20. The apparatus of claim 19, wherein the apparatus is reusable such that, without the use of any single-use materials:

the apparatus is configured to have loaded therein a plurality of information handling systems, be transported from a first location to a second location, and have the plurality of information handling systems be unloaded therefrom.

* * * * *